(12) United States Patent
Tummidi et al.

(10) Patent No.: US 9,618,699 B2
(45) Date of Patent: Apr. 11, 2017

(54) MULTILAYER PHOTONIC ADAPTER

(71) Applicant: Cisco Technology, Inc., San Jose, CA (US)

(72) Inventors: Ravi Sekhar Tummidi, Breinigsville, PA (US); Mark Webster, Bethlehem, PA (US); Vipulkumar Patel, Breinigsville, PA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/658,220

(22) Filed: Mar. 15, 2015

(65) Prior Publication Data

US 2016/0266321 A1  Sep. 15, 2016

(51) Int. Cl.
*G02B 6/12* (2006.01)
*G02B 6/30* (2006.01)
(Continued)

(52) U.S. Cl.
CPC ............ *G02B 6/30* (2013.01); *G02B 6/107* (2013.01); *G02B 6/122* (2013.01);
(Continued)

(58) Field of Classification Search
CPC ...................................................... G02B 6/107
See application file for complete search history.

(56) References Cited

U.S. PATENT DOCUMENTS 4,932,032 A * 6/1990 Koch ................... G02B 6/1228
372/45.01

6,934,444 B2   8/2005 Ghiron et al.
(Continued)

FOREIGN PATENT DOCUMENTS

| EP | 2610657 A1 | 7/2013 |
|---|---|---|
| WO | 2014/047443 A1 | 3/2014 |
| WO | 2016004084 A1 | 1/2016 |

OTHER PUBLICATIONS

Bauters, Jared F. et al., Silicon on ultra-low-loss waveguide photonic integration platform, Optics Info Base, Jan. 7, 2013, vol. 21, No. 1, pp. 544-555.
(Continued)

*Primary Examiner* — Rhonda Peace
(74) *Attorney, Agent, or Firm* — Patterson + Sheridan LLP

(57) ABSTRACT

Embodiments herein describe disposing a waveguide adapter onto an SOI device after the components on a silicon surface layer have been formed. That is, the waveguide adapter is disposed above optical components (e.g., optical modulators, detectors, waveguides, etc) formed in a surface layer. In one embodiment, a waveguide in a bottom layer of the waveguide adapter overlaps a silicon waveguide in the surface layer such that the silicon waveguide and the waveguide in the bottom layer are optically coupled. The waveguide adapter also includes other layers above the bottom layer (e.g., middle and top layers) that also contain waveguides which form an adiabatic optical system for transmitting an optical signal. At least one of the waveguides in the multi-layer adapter is exposed at an optical interface of the SOI device, thereby permitting the SOI device to transmit optical signals to, or receive optical signals from, an external optical component.

18 Claims, 13 Drawing Sheets

(51) Int. Cl.
G02B 6/10 (2006.01)
G02B 6/122 (2006.01)
G02B 6/136 (2006.01)

(52) U.S. Cl.
CPC ........ *G02B 6/12004* (2013.01); *G02B 6/1228* (2013.01); *G02B 6/136* (2013.01); *G02B 2006/121* (2013.01); *G02B 2006/12061* (2013.01); *G02B 2006/12142* (2013.01)

(56) References Cited

U.S. PATENT DOCUMENTS

| | | | |
|---|---|---|---|
| 7,013,067 B2 | 3/2006 | Ghiron et al. | |
| 7,016,569 B2* | 3/2006 | Mule | G02B 6/12002 385/14 |
| 7,415,184 B2 | 8/2008 | Ghiron et al. | |
| 8,121,450 B2 | 2/2012 | Webster et al. | |
| 8,208,768 B2 | 6/2012 | Su et al. | |
| 8,280,207 B2* | 10/2012 | Pinguet | G02B 6/124 385/15 |
| 8,320,721 B2* | 11/2012 | Cevini | G02B 6/305 385/131 |
| 8,447,150 B2* | 5/2013 | Kopp | G02B 6/30 385/14 |
| 8,787,712 B2* | 7/2014 | Grondin | B82Y 20/00 385/14 |
| 8,913,860 B2* | 12/2014 | Ushida | G02B 6/1228 385/131 |
| 9,002,156 B2 | 4/2015 | Ellis-Monaghan et al. | |
| 9,128,240 B2* | 9/2015 | Hatori | G02B 6/12 |
| 9,164,235 B1 | 10/2015 | Tummidi et al. | |
| 2003/0053756 A1* | 3/2003 | Lam | G02B 6/1228 385/49 |
| 2005/0047708 A1* | 3/2005 | Ma | G02B 6/12002 385/14 |
| 2012/0224820 A1 | 9/2012 | Onishi | |
| 2013/0015546 A1* | 1/2013 | Joe | G02B 6/122 257/432 |
| 2013/0322811 A1 | 12/2013 | Meade | |
| 2014/0174149 A1 | 6/2014 | Wicks et al. | |
| 2014/0376857 A1* | 12/2014 | Chantre | G02B 6/12002 385/14 |
| 2014/0376859 A1* | 12/2014 | Joe | G02B 6/12002 385/14 |
| 2015/0010266 A1* | 1/2015 | Webster | G02B 6/122 385/14 |
| 2015/0055912 A1* | 2/2015 | Kachru | G02B 6/136 385/14 |

OTHER PUBLICATIONS

Hatori, Nobuaki et al., A Novel Spot Size Convertor for Hybrid Integrated Light Sources on Photonics-Electronics convergence System, 9th International Conference on Group IV Photonics, Aug. 2012, pp. 171-173, IEEE, Piscataway, United States.

De Ridder, Rene M. et al., Silicon Oxynitride Planar Waveguiding Structures for Application in Optical Communication, IEEE Journal of Selected Topics in Quantum Electronics, Dec. 1998, pp. 930-937, vol. 4, Issue 6, Piscataway, United States.

Sun, Rong, et al., Impedance matching vertical optical waveguide couplers for dense high index contrast circuits, Optics Express, Aug. 4, 2008, vol. 16, No. 16, pp. 11682-11690.

Worhoff, Kerstin, et al., Design, Tolerance Analysis, and Fabrication of Silicon Oxynitride Based Planar Optical Waveguides for Communication Devices, Journal of Lightwave Technology, Aug. 1999, pp. 1401-1407, vol. 17, Issue 8, Piscataway, United States.

Bruel, M. Silicon on insulator material technology, Electronics Letters, Jul. 6, 1995, vol. 31, No. 14, pp. 1201-1202, Piscataway, United States.

Choudhury, A.N.M. Masum et al., Method of Improving Light Coupling Efficiency Between Optical Fibers and Silicon Waveguides, IEEE Photonics Technology Letters, vol. 17, No. 9, Sep. 2005, pp. 1881-1883, Piscataway, United States.

Barkai, Assia et al., Efficient Mode Converter for Coupling between Fiber and Micrometer Size Silicon Waveguides, 4th IEEE International Conference on Group IV Photonics, Sep. 2007, pp. 49-51, IEEE, Piacataway, United States.

Yamada, Hirohito, Analysis of Optical Coupling for SOI Waveguides, PIERS Online, vol. 6, No. 2, 2010, pp. 165-168, The Electromagnetics Academy, Cambridge, United States.

Frumkin, Ted et al., Silicon nanophotonic multitaper for efficient light coupling between fiber and silicon waveguide, Journal of Nanophotonics, vol. 7, 2013, pp. 073084-1-073084-11, SPIE, Bellingham, United States.

Sun, Peng et al., Fiber Coupling to Silicon Waveguides Using Cantilever Couplers, LEOS Annual Meeting Conference Proceedings, 2009, pp. 80-81, Piscataway, United States.

U.S. Appl. No. 14/322,661, entitled Dual Tip Optical Coupler, filed Jul. 2, 2014.

U.S. Appl. No. 14/658,139, entitled Multilayer Photonic Adapter, Office Action issued Jan. 25, 2016, 19 pages.

Almeida, Vilson et al., Nanotaper for compact mode conversion, Optics Letters, vol. 28, No. 15, Aug. 1, 2003, pp. 1302-1304, Optical Society of America, Washington, D.C., United States.

Doylend, J. K., et al., Design and Simulation of an Integrated Fiber-to-Chip Coupler for Silicon-on-Insulator Waveguides, IEEE Journal of Selected Topics in Quantum Electronics, vol. 12, No. 6, Nov./Dec. 2006, pp. 1363-1370.

Vermeulen, D. et al., High-efficiency fiber-to-chip grating couplers realized using an advanced CMOS-compatible Silicon-On-Insulator platform, Optics Express, vol. 18, No. 17, Aug. 16, 2010, pp. 18278-18283.

Tao, S.H., et al., Improving coupling efficiency of fiber-waveguide coupling with a double-tip coupler, Optical Society of America, Dec. 8, 2008, vol. 16, No. 25, pp. 20803-20808.

Alder, T., et al., High-Efficiency Fiber-to-Chip Coupling Using Low-Loss Tapered Single-Mode Fiber, IEEE Photonics Technology Letters, vol. 12 , No. 8 , Aug. 2000, pp. 1016-1018.

Halir, R., et al., Continuously apodized fiber-to-chip surface grating coupler with refractive index engineered subwavelength structure, Optics Letters, vol. 35, No. 19, Oct. 1, 2010, pp. 3243-3245.

Hauffe, R., et al., Methods for Passive Fiber Chip Coupling of Integrated Optical Devices, 50th Proceedings IEEE Electronic Components and Technology Conference, May 21-24, 2000, pp. 238-243.

Khilo, Anatol, et al., Efficient planar fiber-to-chip coupler based on two-stage adiabatic evolution, Optics Express, Jul. 19, 2010, vol. 18, No. 15, pp. 15790-15806.

Sun, Rong et al., High performance asymmetric graded index coupler with integrated lens for high index waveguides, Applied Physics Letters, May 17, 2007, vol. 90 , No. 20, pp. 201116-201116-3.

\* cited by examiner

FIG. 5C        FIG. 5D
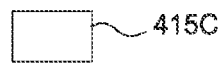
FIG. 5E
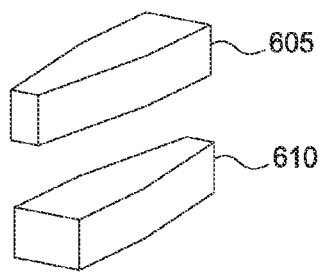
FIG. 6A        FIG. 6B

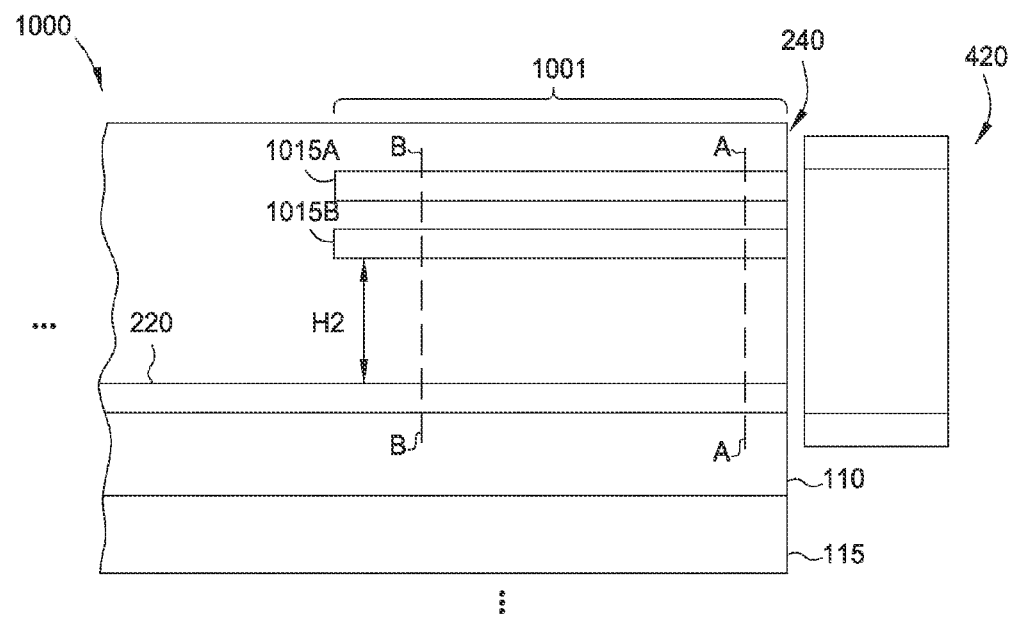
FIG. 10A
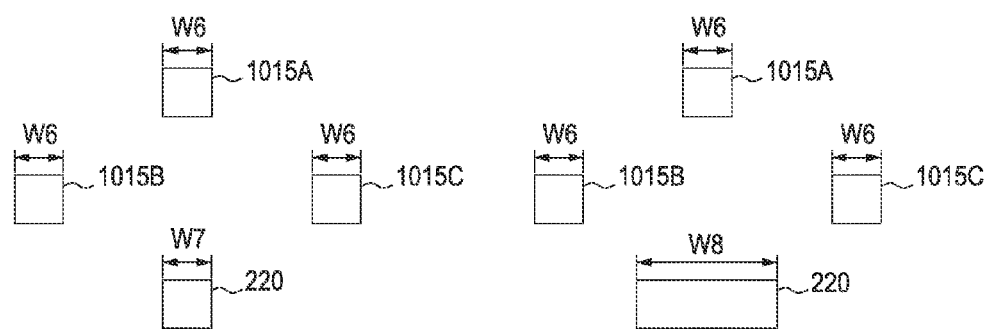
FIG. 10B
FIG. 10C

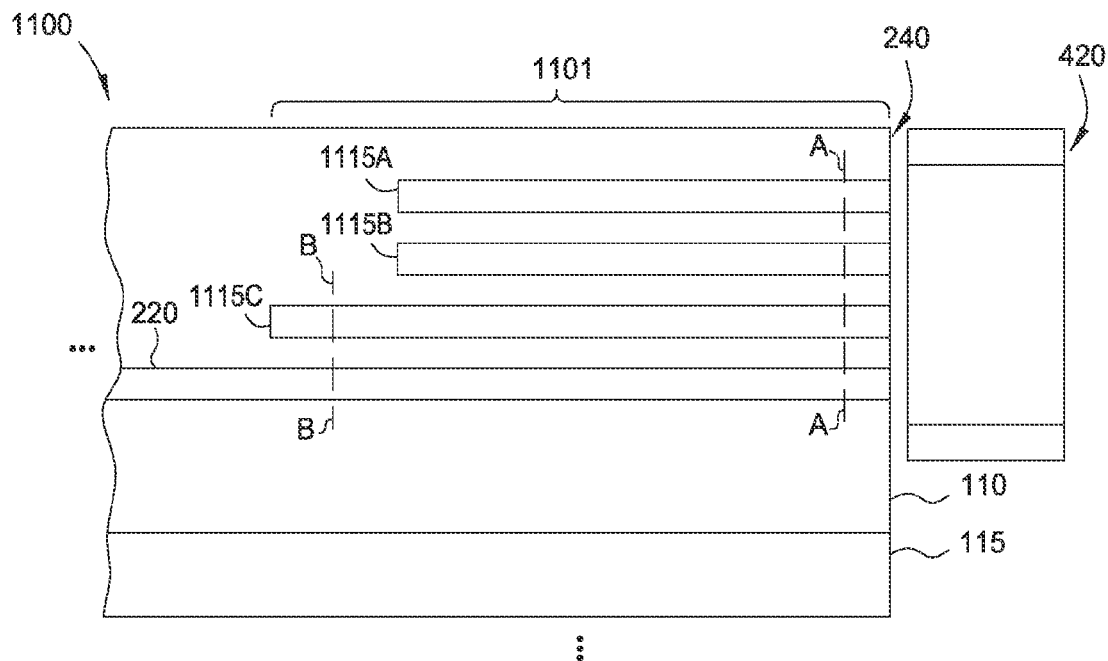
FIG. 11A
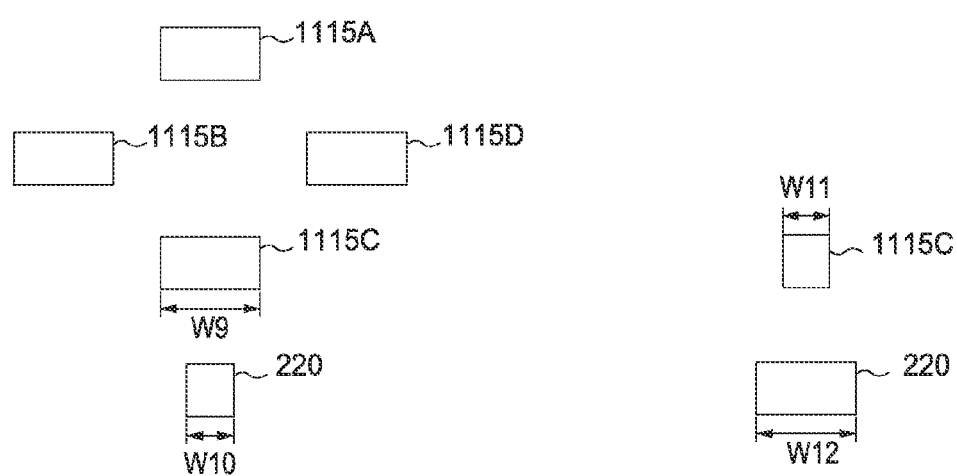
FIG. 11B
FIG. 11C

MULTILAYER PHOTONIC ADAPTER

TECHNICAL FIELD

Embodiments presented in this disclosure generally relate to waveguides in a silicon-on-insulator (SOI) device, and more specifically, to forming waveguide adapters after disposing optical components in the silicon surface layer of the SOI device.

BACKGROUND

SOI optical devices may include an active surface layer that includes waveguides, optical modulators, detectors, CMOS circuitry, metal leads for interfacing with external semiconductor chips, and the like. Some optical systems transmit optical signals from and to this active surface layer. For example, a fiber optic cable may be attached to the SOI optical device and interface with a waveguide on its surface layer. The mode field diameter of the one or more modes of the optical cable may be approximately 10 microns for a single mode cable.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 5A-5E illustrate cross-sectional views of an SOI device with a multi-layer adapter, according to embodiments disclosed herein.

FIGS. 6A-6B illustrate an overlapping waveguide structure for transferring an optical signal between waveguides, according to embodiments disclosed herein.

FIGS. 10A-10C illustrate various views of an SOI device with a multi-layer adapter, according to embodiments disclosed herein.

FIGS. 11A-11C illustrate various views of an SOI device with a multi-layer adapter, according to embodiments disclosed herein.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
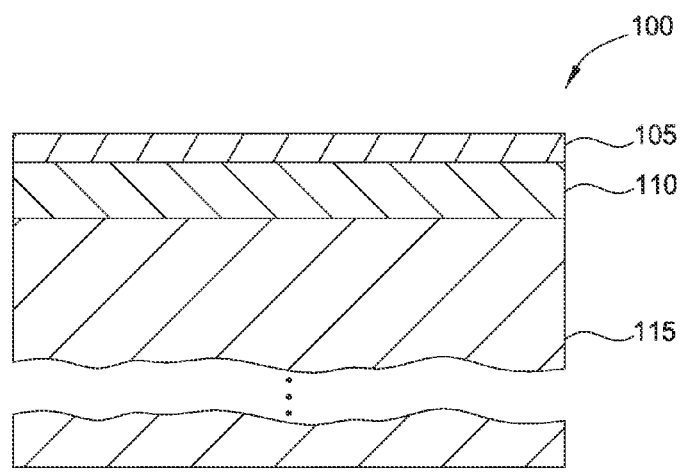
FIG. 1 illustrates an SOI device, according to one embodiment disclosed herein.

One embodiment presented in this disclosure is a method that includes disposing a silicon waveguide in a silicon layer of an optical device and disposing an insulative material on the silicon waveguide. The method also includes disposing a first waveguide of a multi-layer adapter in a first layer of the optical device on the insulative material to optically couple the first waveguide to the silicon waveguide. The method includes disposing a first pair of adjacent metal layers in the optical device, each of the adjacent metal layers comprising a respective planar electrode electrically coupled to an optical component in the silicon layer. The method includes disposing a second waveguide of the multi-layer adapter in a second, different layer of the optical device such that the first and second waveguides form an optical structure for transmitting an optical signal.

Another embodiment presented in this disclosure is an optical device including a silicon layer comprising an optical component and a silicon waveguide and a first waveguide of a multi-layer adapter optically coupled to the silicon waveguide and disposed on a first layer spaced apart from the silicon waveguide. The device includes a first pair of adjacent metal layers, each comprising a respective planar electrode electrically coupled to the optical component in the silicon layer. The device also includes a second waveguide of the multi-layer adapter disposed on a second layer spaced apart from the first layer and disposed between the first pair of adjacent metal layers, the first and second waveguides forming an optical structure for transmitting an optical signal.

Another embodiment presented in this disclosure is a semiconductor on insulator device including a surface layer comprising an optical component and a sub-micron waveguide, a semiconductor substrate, and an insulation layer disposed between the surface layer and the semiconductor substrate. The device includes a multi-layer adapter optically coupling the sub-micron waveguide to an optical interface configured to transfer an optical signal between the SOI device and an external optical component, where the multi-layer adapter comprises a plurality of layers each comprising at least one waveguide for propagating the optical signal. Further, each of the plurality of layers is disposed between adjacent metal layers and each metal layer comprising a planar electrode electrically coupled to the optical component in the surface layer.

Example Embodiments

Transmitting optical signals from and to the active surface layer in SOI optical devices introduces many challenges. For example, a fiber optic cable may be attached to the SOI optical device and interface with a waveguide in the SOI device's surface layer; however, the diameter of the one or more modes of the optic cable (e.g., approximately 10 microns for a single-mode cable) may have a much different size than the mode of a sub-micron dimensioned waveguide tasked with routing the optical signal in the SOI device. Accordingly, directly interfacing the fiber optic cable with the sub-micron waveguide may result in low transmission efficiency or high coupling loss. An SOI device may include a waveguide adapter that couples an external optical component—e.g., light from a fiber optic cable, semiconductor waveguide or a laser directly coupled to the SOI device—to a waveguide in the SOI device. The waveguide adapter may improve transmission efficiency relative to directly coupling the light source to the waveguide. In one embodiment, the waveguide adapter may be located on the same surface layer as the waveguide. Furthermore, the waveguide adapter may include several layers, which may have varying concentrations of dopants or different materials shaped to focus the received optical signal into the waveguide.

However, fabricating the waveguide adapter on the same layer as the waveguide may impose constraints on the techniques and materials that are used to form the waveguide adapter. For example, the surface layer in the SOI device may include components that are made using CMOS fabrication techniques. Many of these components however, are sensitive to temperature. For example, if metal is deposited onto the surface layer, the temperature of the SOI device may not be allowed to exceed 300-400 degrees Celsius or the metal may migrate and cause a defect (e.g., a short circuit) in the SOI device. Accordingly, if the waveguide adapter contains other deposited materials that require annealing to achieve low-loss operation, the SOI device could not be subjected to high-annealing temperatures (e.g., 1000 degrees Celsius) without potentially harming other components in the surface layer of the SOI device. Instead, in some SOI devices, the waveguide adapter may be embedded into the insulation layer of the SOI device. Doing so enables the waveguide adapter to be formed before the surface layer components are added to the SOI device. Different techniques for forming a waveguide adapter below the surface layer of an SOI device are disclosed in U.S. patent application Ser. No. 13/935,277 "Photonic Integration Platform" which is hereby incorporated by reference.

Instead of disposing the waveguide adapter in, or below, the surface layer, embodiments herein describe disposing the waveguide adapter onto the SOI device above the silicon surface layer. That is, the waveguide adapter is disposed above optical components (e.g., optical modulators, detectors, waveguides, etc) formed in the surface layer. In one embodiment, a waveguide in a bottom layer of the waveguide adapter that is closest to the surface layer overlaps a silicon waveguide in the surface layer such that the silicon waveguide and the waveguide in the bottom layer are optically coupled. The waveguide adapter also includes other layers above the bottom layer (e.g., middle and top layers) that also contain waveguides. In one embodiment, the waveguides in the adapter form an optical adiabatic structure for transmitting an optical signal (either TE or TM). An adiabatic structure is an optical structure where the optical signal propagates such that there is minimal or no coupling of the signal to other non-intended modes. In one example, an optical signal remains in the same optical mode as it propagates in the adiabatic structure.

At least one of the waveguides in the multi-layer adapter is exposed at an optical interface of the SOI device, thereby permitting the SOI device to transmit optical signals to, or receive optical signals from, an external optical component (e.g., an optical fiber or laser). Although forming the waveguide adapter above the surface layer may introduce restrictions on the thermal temperatures used to form the waveguides in the adapter, doing so may simplify fabrication process and reduce the cost of manufacturing the SOI device. Furthermore, because the distance the optical signal travels in the waveguide adapter may be short (e.g., less than 1 mm), using high thermal temperatures to achieve low-loss waveguides may not be critical.

FIG. 1 illustrates an SOI device 100, according to one embodiment disclosed herein. As shown, SOI device 100 includes a surface layer 105, a buried insulation layer 110 (also referred to as buried oxide (BOX) layer), and a semiconductor substrate 115. Although the embodiments herein refer to the surface layer 105 and substrate 115 as crystalline silicon, the disclosure is not limited to such. For example, other semiconductors or optically transmissive materials may be used to form the structure 100 shown here. Moreover, the surface 105 and the substrate 115 may be made of the same material, but in other embodiments, these layers 105, 115 may be made from different materials.

The thickness of the surface layer 105 may range from less than 100 nanometers to greater than a micron. More specifically, the surface layer 105 may be between 100-300 nanometers thick. The thickness of the insulation layer 110 may vary depending on the desired application. As will be discussed in greater detail below, the thickness of the insulation layer 110 may directly depend on the size of the mode being coupled to the SOI device 100 and the desired efficiency. As such, the thickness of insulation layer 110 may range from less than one micron to tens of microns. The thickness of the substrate 115 may vary widely depending on the specific application of the SOI device 100. For example, the substrate 115 may be the thickness of a typical semiconductor wafer (e.g., 100-700 microns) or may be thinned and mounted on another substrate.

For optical applications, the surface layer 105 of the SOI device 100 may be etched to form one or more silicon waveguides. Because silicon has a higher refractive index compared to an insulator such as silicon dioxide or silicon oxynitride, the optical signal remains primarily in the waveguide as it propagates through the surface layer 105.

Figure 2:
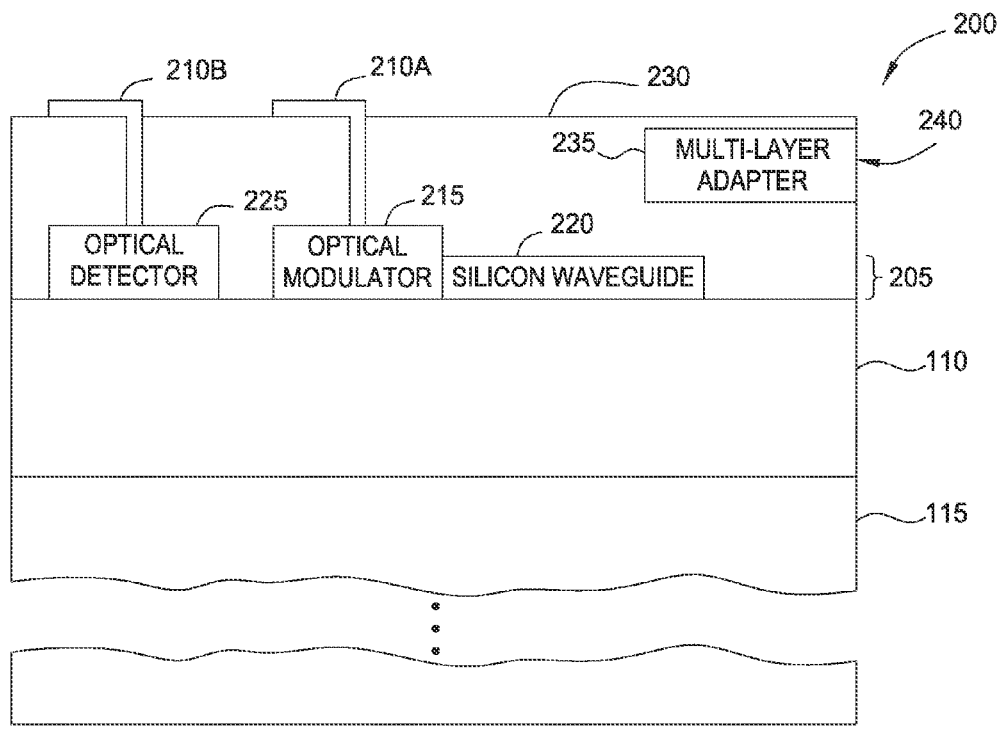
FIG. 2 illustrates an SOI device with a multi-layer adapter, according to one embodiment disclosed herein.

FIG. 2 illustrates an SOI device with a multi-layer adapter, according to one embodiment disclosed herein. Like the SOI device 100 in FIG. 1, SOI device 200 includes a top surface layer 205 which includes crystalline silicon, the insulation layer 110, and substrate 115. However, the surface layer 205 has been processed to include various optical components that may be used in an optical device. For example, surface layer 205 includes at least a portion of optical modulator 215 which is electrically coupled to a conductive lead 210A that is exposed on a top surface of the SOI device 200. The modulator 215 may have been formed by performing various fabrication steps on the silicon layer such as etching or doping the crystalline silicon as well as depositing additional materials onto surface layer 205 (e.g., amorphous silicon or polysilicon). The conductive lead 210A may be used to transmit a data signal that controls the optical modulator 215. For example, the optical modulator 215 may be a CMOS capacitor including n-type and p-type doped regions coupled to respective metal leads for changing the phase of an optical signal passing through the modulator 215. Although not shown, the metal leads 210 may be connected to an integrated circuit mounted onto the SOI device 200 that provides the data signals which control the modulator 215. In another embodiment, the integrated circuit may be physically separate from the SOI device 200 but coupled to the metal leads 210 through bond wires.

Like optical modulator 215, a silicon waveguide 220 may have been fabricated from the silicon surface layer 105 shown in FIG. 1. In one embodiment, the silicon waveguide 220 is a sub-micron waveguide where the width and height (i.e., thickness) of the waveguide are less than 1 micron. The SOI device 200 uses waveguide 220 to carry an optical signal to different areas of the surface layer 205. For example, the optical modulator 215 may modulate a received optical signal which is then outputted and propagated along waveguide 220.

In addition to including components made from silicon, the SOI device 200 includes optical detector 225 which may be made from other materials (e.g., optical detector 225 may be a geranium detector) or a combination of silicon with other materials. These other materials may be deposited on surface layer 205 using any suitable deposition technique. For example, in one embodiment, surface layer 205 may be processed to include an optical light source (not shown). The light source (e.g., a monolithic light source in silicon or a source made from other materials and bonded onto surface layer 105) may directly couple to silicon waveguide 220 in order to carry light emitted from the light source to other components in the SOI device 200.

Once the surface layer 205 is processed to include the desired components, the components may be covered with a protective, insulative material 230 (e.g., an electrical insulative material) which may serve as a suitable base for mounting additional circuitry on the SOI device 200. In this manner, the silicon surface layer 205 of SOI device 200 may be processed using any number of techniques to form a device for performing a particular application such as optical modulation, detection, amplification, generating an optical signal, and the like.

The insulative material 230 also supports a multi-layer adapter 235 which is disposed above the optical components in the surface layer 205—e.g., optical detector 225, modulator 215 and waveguide 220. In one embodiment, at least a portion of the adapter 235 overlaps the silicon waveguide 220 such that a waveguide in the adapter 235 (not shown) is optically (or adiabatically) coupled to the silicon waveguide 220, thereby permitting optical signals to be passed between the adapter 235 and waveguide 220. As described in further detail below, the adapter 235 includes multiple layers which each contain one or more waveguides for transmitting an optical signal collectively. Furthermore, at least one of these waveguides is exposed on an optical interface 240 of the SOI device 200. As will be discussed later, an optical fiber or laser may be coupled to SOI device 200 at the interface 240 to transmit or receive an optical signal.

Figure 3:
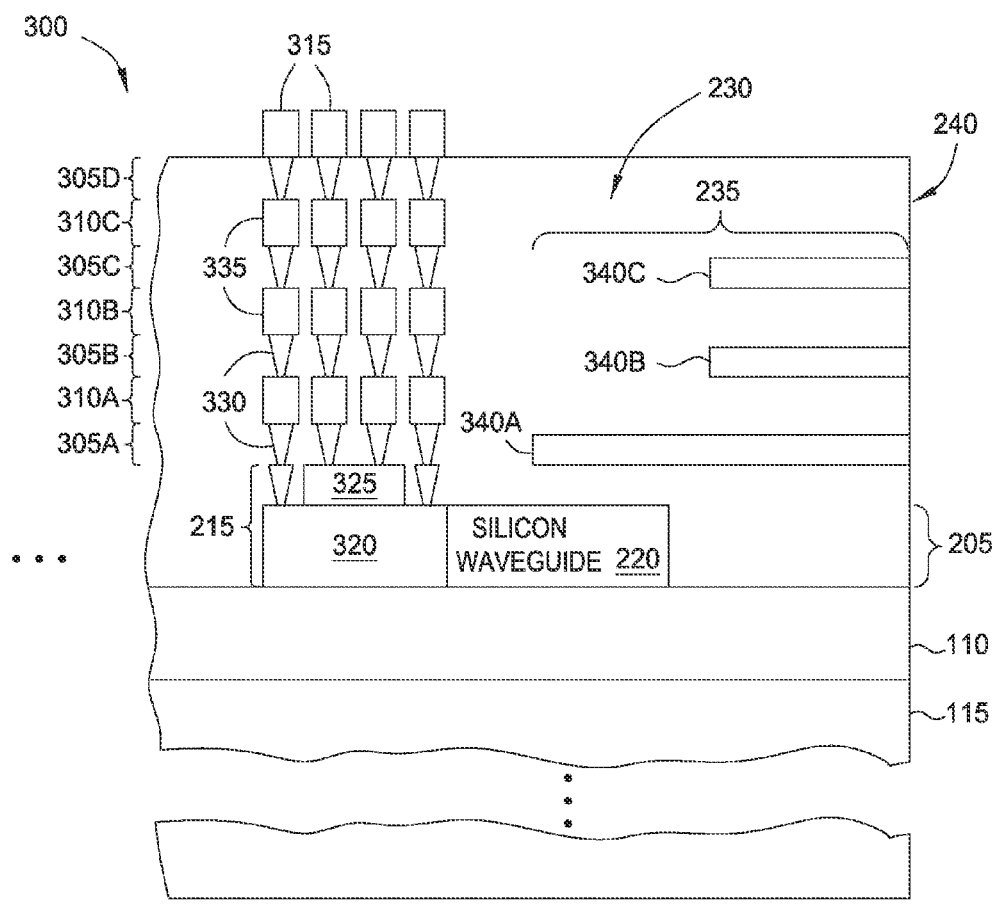
FIG. 3 illustrates an SOI device with a multi-layer adapter interleaved with metal layers, according to one embodiment disclosed herein.

FIG. 3 illustrates an SOI device 300 with a multi-layer adapter 235 interleaved with metal layers 310, according to one embodiment disclosed herein. As shown, SOI device 300 includes an optical modulator 215 coupled to a silicon waveguide 220 which may either be used to input an optical signal (e.g., a continuous wave) into the modulator 215 or to output an optical signal (e.g., a modulated signal) from the modulator 215. Furthermore, the modulator 215 includes a lower portion 320 and an upper portion 325. The lower portion 320 is located in the surface layer 205, and as such, includes crystalline silicon that may have been doped and etched into a desired shape. The upper portion 325 may be formed from silicon selected from amorphous silicon, polysilicon, or crystalline silicon. In another embodiment, the upper portion 325 may be formed with a different semiconductor material—i.e., a material other than silicon.

To control the optical modulation performed by the lower and upper portions 320, 325, SOI device 300 includes metal layers 310 and via layers 305 which electrically couple the portions 320, 325 to the conductive pads 315 at an upper surface of the SOI device 300. For example, the SOI device 300 includes interconnected vias 330 and planar electrodes 335 which form conductive leads (e.g., conductive leads 210A and 210B shown in FIG. 2) that permit control signals to drive the lower and upper portions 320, 325 of the optical modulator 215. The vias 330 route electrical signals primarily in a vertical direction (e.g., between metal layers 310), while the planar electrodes 335 may carry the control signals in a lateral direction through the SOI device 300 (e.g., between upper and lower vias 330 coupling to the same metal layer 310). In this embodiment, device 300 includes multiple metal and via layers 305, 310 in order to electrically couple the optical modulator 215 to the conductive pads 315. As described above, the conductive pads 315 may be coupled to a control circuit (e.g., a separate IC) which provides the control signals for the modulator 215.

Silicon waveguide 220 is optically coupled to the multi-layer adapter 235 which includes multiple layers that each includes at least one waveguide 340. Specifically, the waveguide 340 closest to the surface layer 205 (i.e., waveguide 340A) is optically coupled (i.e., evanescently or adiabatically coupled) to the silicon waveguide 220 such that an optical signal can be transmitted from waveguide 340A to silicon waveguide 220 or vice versa. As shown, waveguide 340A partially overlaps the silicon waveguide 220 in a direction that is normal to the surface layer 205. In this example, the gap between the silicon waveguide 220 and bottommost waveguide 340A (which includes insulative material 230) is set such that the waveguide 340A is further away from the surface layer 205 than the upper portion 325 of the optical modulator 215. That is, the waveguide 340A is disposed in a layer (i.e., via layer 305A) which is above upper portion 325. However, in other embodiments, the waveguide 340A may be located in the same layer as the upper portion 325 (but still have a gap separating waveguide 340A from silicon waveguide 220). Alternatively, the waveguide 340A may be located even further away from the surface layer 205—e.g., within via layer 305B or 305C.

The waveguide 340A is proximate to another waveguide 340 in the adapter 235—e.g., waveguides 340B and 340C—such that the waveguides 340 form an optical adiabatic structure for transmitting optical signals. In one embodiment, the waveguides 340 are formed and spaced such that the waveguides 340 collectively form an adiabatic waveguide which permits single modal (TE or TM) propagation. Where an optical signal is being transferred from the silicon waveguide 220 to the adapter 235, the optical signal is first received by waveguide 340A but then spreads out across the other waveguides 340A-C as the signal propagates towards the optical interface 240. In this manner, the size of the optical mode may increase adiabatically to better match the size of optical mode in an external optical component placed at the optical interface 240—e.g., an optical fiber. For example, while propagating in the silicon waveguide 220 (which may have dimensions that are less than 1 micron), the mode size may be approximately 1 micron in diameter. However, because the waveguides 340 in the adapter 235 form an optical mode in an adiabatic structure, this mode size can be adiabatically increased to better match the mode size of the external optical component (e.g., 6-15 microns). Doing so improves the efficiency of the optical coupling between the SOI device 300 and the external optical component, especially when the optical signal is confined in a single mode.

Although FIG. 3 illustrates interleaving metal layers 310 with via layers 305, in another embodiment, multiple via layers 305 may be placed between metal layers 310. That is, the vias 330 in one via layer 305 may connect to the vias 330 in another via layer 305 rather than to a planar electrode 335. Moreover, FIG. 3 illustrates placing each of the waveguides 340 in the same layers 305 as the vias 330 (also referred to as intermetal layers). However, the waveguides 340 do not need to be located on every other via layer 305. For example, waveguide 340B may be located on via layer 305C instead of layer 305B such that there are two metal layers 310 between waveguide 340A and 340B. When forming the via layers 305, the waveguides 340 are disposed in the same layers using either different processing steps or the same processing steps used to form the vias 330. Moreover, although the waveguides 340 are shown here as being interspersed between the metal layers 310, in another embodiment the waveguides 340 may be on the same layer as the metal layers 310, or a combination of the metal layers 310 and via layers 305. Nonetheless, in one embodiment, the adapter 235 does not include any conductive material (neither vias 330 nor planar electrodes 335) directly between any of the waveguides 340.

In one embodiment, an SOI device 300 may not include the planar electrodes 335 or the vias 330. Nonetheless, the SOI device 300 may be formed such that the multi-layer adapter 235 is disposed in the insulative material 230 above the surface layer 205 as shown. That is, the adapter 235 may still have the structure shown in FIG. 3 except the waveguides 340 are not disposed on the same layers as vias 330 or planar electrodes 335.

In one embodiment, the different waveguides 340 in the adapter 235 are made from the same material (e.g., silicon nitride, silicon oxynitride, polysilicon, or amorphous silicon) which is embedded in the insulative material 230 (e.g., silicon dioxide or silicon oxynitride) which is different than the material used to form the waveguides 340. Alternatively, the waveguides 340 may be made from different materials. In one embodiment, unlike the silicon waveguide 220, the waveguides 340 are not made from crystalline silicon.

Although FIG. 3 illustrates using the adapter 235 to transmit an optical signal to, or receive an optical signal from, the optical modulator 215 in the surface layer 205, the present disclosure is not limited to such. For example, the multi-layer adapter 235 may be used to transfer an optical signal to or from a PN junction, Ge modulators, hybrid integrated III-V lasers, detectors, and the like.

Figure 4A:
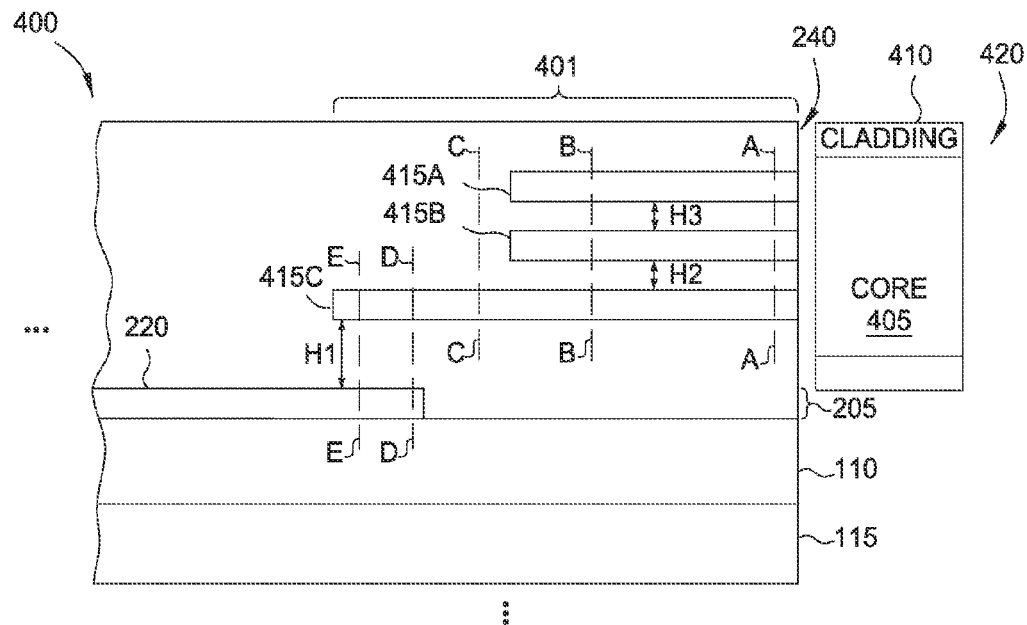
FIGS. 4A-4B illustrate side views of SOI devices with multi-layer adapters, according to one embodiment disclosed herein.
Figure 4B:
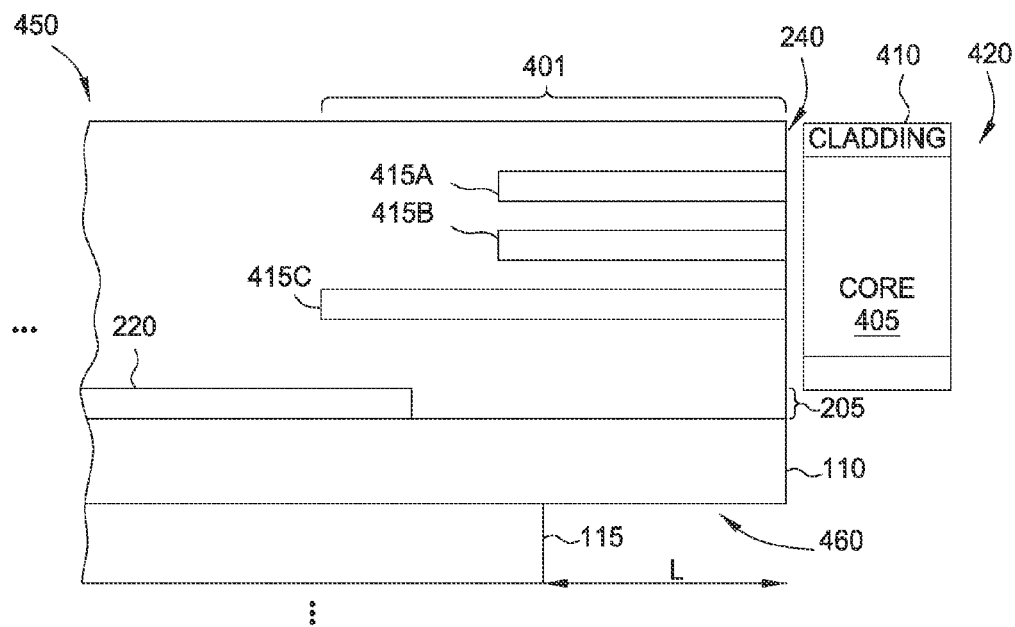

FIGS. 4A-4B illustrate side views of SOI devices with a multi-layer adapters, according to one embodiment disclosed herein. Specifically, FIG. 4A illustrates a SOI device 400 that includes a multi-layer adapter 401 above the surface layer 205 which contains the silicon waveguide 220. Although not shown, the silicon waveguide 220 may traverse the surface layer 205 to couple an optical signal to various optical components in the surface layer 205.

In this example, the multi-layer adapter 401 is located above the surface layer 205, insulation layer 110, and semiconductor substrate 115. Moreover, the adapter 401 abuts—i.e., is exposed on—a coupling interface 240 of the SOI device 400. In another example, the adapter 401 may be slightly recessed (e.g., 1-5 microns) from the coupling interface 240. This interface 240 may be used by an external optical component 420 (shown here as an optical fiber containing a core 405 and cladding 410) to transmit light into or receive light from the adapter 401. Thus, the coupling interface 240 may be an external facing surface of the SOI device 400. The adapter 401 includes separate waveguides 415 (or prongs) embedded in an insulation material that is different than the material of the waveguides 415. For example, the waveguides 415 may be silicon nitride, while the insulation material is silicon oxynitride or silicon dioxide. Generally, the waveguides 415 may be made of any material with a higher refractive index than the material of the insulation material surrounding the waveguides.

Referring back to FIG. 3, the waveguides 415 may be located in intermetal via layers that are between metal layers in the SOI device. As such, the adapter 401 may be formed in the SOI device 400 in parallel with forming electrical connections to optical components in the surface layer 205. However, in other embodiments, the waveguides 415 may be formed on the same level as the metal layers or be used in a SOI device that does not include electrical connections extending away from the surface layer 205 in a direction normal to the surface layer 205.

The gap (H1) between the silicon waveguide 220 and the waveguide 415C ranges between a few nanometers to 1 micron, or more specifically, from 10 nm to 500 nm. Moreover, waveguide 415C partially overlaps the silicon waveguide 220 such that the two waveguides are adiabatically coupled. Waveguide 415C is also separated from waveguide 415B by a gap (H2) that ranges from hundreds of nanometers to 5 microns, or more specifically, from 200 nm to 2.5 microns. The gap (H3) between waveguide 415B and waveguide 415A may have a similar range as the gap (H2) between waveguide 415B and 415C. In one example, the gaps H2 and H3 may be the same, while in other examples, the gaps may be different. For example, if the waveguides 415A-C are separated by exactly one metal layer, then the gaps may be the same. However, if waveguides 415A and 415B are separated by two metal layers while waveguides 415B and 415C are separated by only one metal layer, than gap H3 may be larger than gap H2.

FIG. 4B illustrates a SOI device 450 with a similar structure as the SOI device 400 in FIG. 4A except that here the silicon substrate 115 includes a recess 460. For example, the structure of SOI device 450 may result from performing a further processing step on SOI device 400 in FIG. 4A where the portion of the substrate 115 exposed at the optical interface 240 is etched to form a feature defining recess 460. Doing so may reduce optical leakage into the substrate 115 as optical signals are transferred between the SOI device 450 and the optical component 420. For example, the recess 460 may be especially useful when adapter 401 is configured as an adiabatic coupler, or when the adapter 401 propagates large mode sizes (e.g., greater than 5 microns). In one embodiment, the length (L) of recess 460 is between 50 to 300 microns.

Figure 5A:
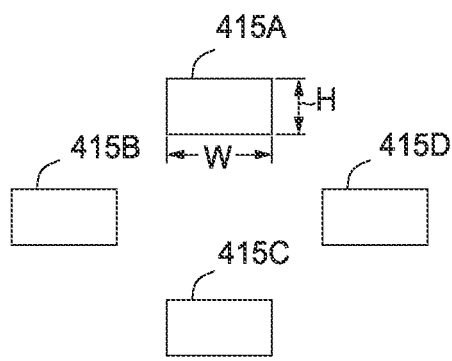

FIGS. 5A-5E illustrate cross-sectional views of the multi-layer adapter in FIG. 4A, according to embodiments disclosed herein. Specifically, FIG. 5A illustrates the cross section A-A of a portion of the multi-layer adapter 401 in FIG. 4A that is closest to the coupling interface 240. Here, adapter 401 includes four separate waveguides 415A-D that may have the same or similar width (W) and height (H) (i.e., thickness) dimensions. These dimensions, as well as the spacing between the waveguides 415A-D may vary depending on the specific application. In the example shown, the waveguide adapter 401 is configured to interface with a single mode optical fiber with a core diameter of approximately 8-10 microns. As will be appreciated by one of ordinary skill in the art, these dimensions may vary depending on the specific application. For example, the dimensions may be chosen such that the mode of the waveguide at the coupling interface substantially matches the mode of the external device to which light is to be coupled to or from. Here, the width of the waveguides 415A-D may range from approximately 150-300 nanometers with a height between 150-250 nanometers. More specifically, the width may be around 150 nanometers while the height is approximately 200 nanometers. The distance between waveguide 415A and waveguide 415C and the distance between waveguide 415D and waveguide 415B may be around two microns. As mentioned above, the dimensions, as well as the spacing, of the waveguides 415 may vary according to the mode or design of the external light source coupled to the SOI device.

Figure 5B:
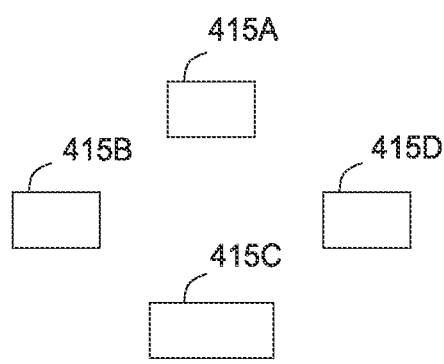

FIG. 5B illustrates the cross section B-B of the waveguide adapter 401. This figure illustrates that as the multi-layer adapter 401 extends away from the coupling interface 240, the widths of the waveguides 415A, 415B, and 415D decrease while the width of waveguide 415C, which is closest to the surface layer 205, increases. In one embodiment, the tapering of widths of the waveguides 415B-D is done in an adiabatic fashion. The tapering results in a gradual transition of optical energy from an optical mode which is confined by all the waveguides 415A-D at or near the coupling interface where the widths and heights of all the waveguides 415A-D are same, to a mode which is gradually confined more and more in the waveguide 415C at positions farther away from the coupling interface. This tapering transfers the optical energy confined by waveguides 415A-D near the coupling interface to waveguide 415C alone at locations farther away from the coupling interface. However, the opposite is also true. That is, tapering the widths also enables a signal introduced in the lower waveguide 415C to be transferred to a mode confined by waveguides 415A-D as the optical signal propagates towards the coupling interface. The widths of the waveguides 415A-D may change continuously (e.g., a linear or non-linear fashion such as exponentially or at higher order polynomial profiles) or at discrete increments as the waveguide adapter 401 extends away from the coupling interface. As shown in FIGS. 4A and 4B, eventually the waveguides 415A, 415B, and 415D terminate, while waveguide 415C continues to transmit the optical signal. In one embodiment, the adapter 401 may extend for approximately 300 microns from the coupling interface before the waveguides 415A, 415B, and 415D terminate. Furthermore, the waveguide adapter 401 may taper for all of this length or for only a portion thereof. For example, the widths of the waveguides 415A-D may remain substantially equivalent for the first five to ten microns from the coupling interface before the widths of waveguides 415A-D begin to change.

FIG. 5C illustrates the cross section C-C of the adapter 401 where only waveguide 415C carries the optical signal. Although shown as being linear, waveguide 415C may bend or twist to carry the optical signal to different areas of the SOI device. Thus, the length of waveguide 415C may be much larger than the lengths of waveguides 415A, 415B, and 415D to enable waveguide 415C to carry an optical signal to different areas of the SOI device.

FIG. 5D illustrates the cross section D-D where the adapter 401 overlaps the silicon waveguide 220. As shown, the width of waveguide 415C is larger than the width of the silicon waveguide 220 in the surface layer 205. As above, the distance between waveguide 415C and the waveguide 220 may range from hundreds of nanometers to only a few nanometers depending on the techniques used to fabricate the SOI device. In some fabrication techniques, a portion of waveguide 415C may directly contact waveguide 220.

FIG. 5E illustrates the cross section E-E where the adapter 401 overlaps the silicon waveguide 220. Here, the width of waveguide 415C has shrunk while the width of the waveguide 220 has increased. This tapering, which is again done in an adiabatic fashion, results in the optical signal in waveguide 415C transferring to waveguide 220, and vice versa, with minimal loss. Eventually, waveguide 415C terminates and waveguide 220 propagates the optical signal to one or more optical components located on the surface layer.

The waveguide adapter may also be used to transfer an optical signal from the surface layer to the coupling interface and onto an external optical component such as an optical fiber. Here, the optical signal propagates along the waveguide 220 until the signal reaches a portion of the SOI device where the waveguide 415C overlaps waveguide 220. The tapering design transfers the optical signal from waveguide 220 to waveguide 415C. Before reaching the coupling interface, waveguide 415C begins to narrow which gradually transfers the optical energy into a mode confined by the four waveguides 415A-D. At the coupling interfaces, the waveguides 415A-D collectively transmit the optical signal into the external optical component—e.g., an optical fiber.

Although the embodiments above discuss tapering the waveguides 415A-D by changing the width, a similar transfer of optical power may occur if the heights are tapered, or some combination of both. However, tapering the height of the waveguides 415A-D may require different lithography and fabrication techniques or different materials.

FIGS. 6A-6B illustrate an overlapping waveguide structure for transferring an optical signal between waveguides, according to embodiments disclosed herein. As shown, FIG. 6A illustrates a plan view of a first tapered waveguide 605 partially overlapping a second tapered waveguide 610. Specifically, FIG. 6A may be the arrangement of the portion of the SOI devices in FIGS. 4A and 4B where the waveguide 415C overlaps waveguide 220. The tapering of the waveguides is done in a manner to form an adiabatic structure to minimize optical loss. Although FIGS. 6A and 6B illustrate that the widths of the tapers vary linearly, the waveguides can also taper in a non-linear fashion for example exponentially or some higher order polynomial profile as long as the adiabatic criterion is satisfied. In one embodiment the distance between the first and second waveguides 605 and 610 is less than a micron. For example, the waveguides 605, 610 may be separated by 100 nanometers or less. The separation distance may affect the efficiency at which an optical signal transfers between the waveguides 605 and 610 as well as the length of the device, and thus, an SOI structure may be designed such that the waveguides 605 and 610 are as close as fabrication techniques allow.

FIG. 6B illustrate a top view of waveguides 605 and 610. By at least partially overlapping the waveguides 605, 610, an optical signal may be transferred from a waveguide above the surface layer (e.g., the first tapered waveguide 605) to a waveguide in the active surface layer (e.g., the second tapered waveguide 610) of the SOI device. In one embodiment, the waveguides 605, 610 only partially overlap where their respective ends begin to taper. The slope or shape of the taper may depend on the material used for forming the waveguides 605, 610 as well as the height of waveguides 605, 610. In one embodiment, at the widest point, the waveguides 605, 610 may have a width that ranges from 300 nanometers to 2 microns. At the narrowest point, the waveguides 605, 610 may have a width from 100 nanometers to 200 nanometers. The length of the tapering portion may be in the range from 10 microns to 50 microns—e.g., around 20 microns.

Figure 7A:
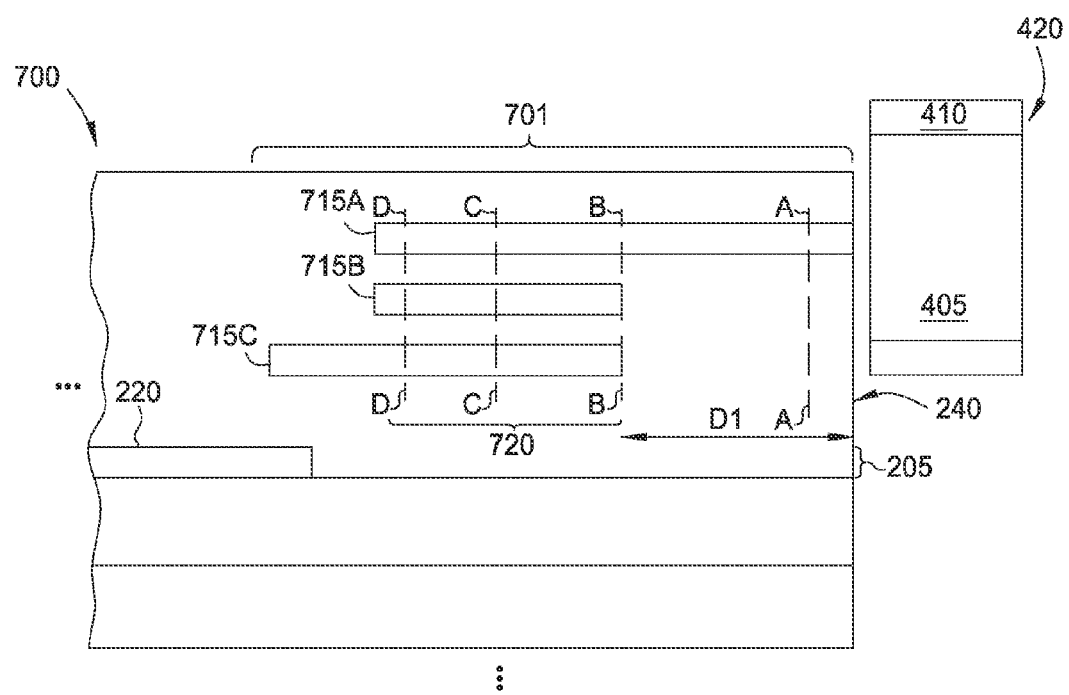
FIGS. 7A and 7B illustrates side views of an SOI device with a multi-layer adapter, according to embodiments disclosed herein.
Figure 7B:
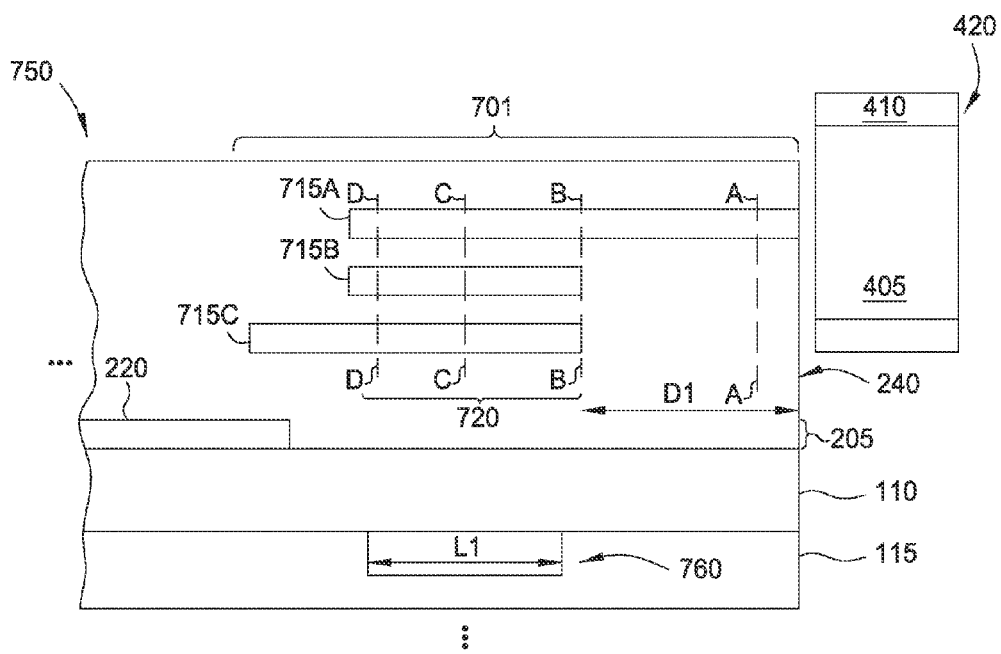

FIGS. 7A and 7B illustrate side views of an SOI device 700 with a multi-layer adapter 701, according to embodiments disclosed herein. Specifically, SOI device 700 in FIG. 7A includes a multi-layer adapter 701 above the surface layer 205 which contains a silicon waveguide 220. Although not shown, the silicon waveguide 220 may traverse the surface layer 205 to couple an optical signal to various optical components in the surface layer 205. The adapter 701 differs from the adapter 401 shown in FIGS. 4A and 4B in that not all of the waveguides 715 (or prongs) in the adapter extend to the optical interface 240. Instead, only the waveguide furthest from the surface layer 205 (i.e., waveguide 715A) is exposed (or is recessed slightly) at the optical interface 240. That is, the other waveguides terminate a distance D1 from the optical interface 240 which may range from 50 to 200 microns, or more specifically, from 100 to 150 microns. As such, waveguide 715A is primarily used to transfer optical signals between the SOI device 700 and the optical component 420 via the optical interface 240. In one embodiment, the optical component 420 may be centered at the position of waveguide 715A on the optical interface 240 so that the optical signal transmitted by the waveguide 715A is captured within the dimensions of the optical component 420. Similarly, centering waveguide 715A with component 420 may improve efficiency when transmitting an optical signal from component 420 to waveguide 715A.

In one embodiment, the portion of adapter 701 which includes all the waveguides 715A-C forms an optical via 720 that is used to transfer optical signals vertically (as well as horizontally) through different layers in the SOI device 700. In this example, the optical via 720 transfers an optical signal between the layer that includes the top waveguide 715A and the layer that includes the bottom waveguide 715C. Thus, similar to an electrical via, the optical via 720 of adapter 701 provides an optical path for transferring optical signals between different horizontal layers in the SOI device 700.

SOI device 750 in FIG. 7B is similar to SOI device 700 in FIG. 7A except for the addition of a trench 760 aligned with at least a portion of the optical via 720. When an optical signal propagates in the top waveguide 715A near the optical interface 240, the mode size is small, and thus, the material of the substrate 115 (e.g., silicon) has little affect on the optical signal. However, the optical via 720 transfers the optical signal from the top waveguide 715A into the silicon waveguide 220 (or vice versa). As described below, the waveguides 715 are shaped so that the optical mode expands as the optical signal moves from either the right or left ends of the optical via 720 towards the middle of the optical via 720 where the optical mode includes all of the waveguides 715. In one embodiment, the optical mode is the largest in the adapter 701 at the middle of the optical via 720. The mode may be so large that it extends into the substrate 115, thereby causing energy to leak into the substrate 115. Put differently, when expanding the optical mode in the optical via 720, the high index material of the substrate 115 may cause the optical signal to leak. This leakage may be more problematic for TM mode signals.

To reduce this leakage, SOI device 750 includes trench 760 which may be filled with air or a low index material such as optically transparent epoxy. Removing the substrate material to form trench 760, may reduce the interaction of the optical mode with the substrate 115 by more tightly confining the mode in the waveguides 715 of the optical via 720, and thus, reduce the optical leakage. In one embodiment, trench 760 is centered at the middle of the optical via 720. Although shown as having a shorter length (L1) than the optical via, in other embodiments, the trench 760 may be as long as or longer than the optical via 720. For example, the length of the optical via may range from 100 to 500 microns, while the length L1 of the trench 720 ranges from 50 to 300 microns. As shown, the trench 720 does not extend underneath the portion of waveguide 715C not in the optical via 720 or underneath the silicon waveguide 220 since the optical mode in these regions may be too small to extend into, or interact with, the substrate 115.

The width of the trench 720 (i.e., the direction into and out of the page) may vary or remain constant along its length L1. Thus, the trench 720, when viewed from the top, may have circular, elliptical, rectangular, trapezoidal, or triangular shape. Referring to FIG. 8B, the width of trench 720 near the middle of the optical via 720 where the optical mode is the largest may be at least as long as the distance between waveguide 715B and 715D—e.g., between 3-6 microns. Doing so reduces the likelihood that the dimensions of the optical mode will include the substrate material 115. In one embodiment, the depth of the trench 760 in the direction perpendicular to the surface of the substrate 115 facing the optical via 720 is large enough such that the optical mode does not interact with the substrate 115. In one embodiment, the depth of the trench 760 is greater than 5 microns. In another embodiment, the depth of the trench 760 may extend through the substrate 115 to form a pocket beneath the optical via 720.

Figure 8A:
FIGS. 8A-8D illustrate cross-sectional views of the multi-layer adapter shown in FIGS. 7A and 7B with the multi-layer adapter, according to embodiments disclosed herein.
Figure 8B:
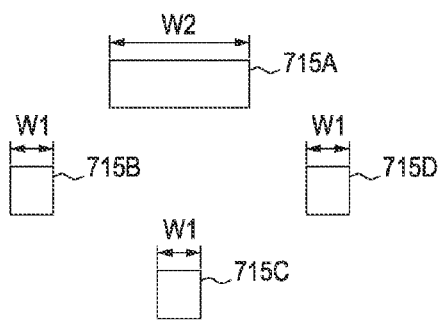

FIGS. 8A-8D illustrate cross-sectional views of the multi-layer adapter shown in FIGS. 7A and 7B, according to embodiments disclosed herein. Specifically, FIG. 8A illustrates the cross section A-A in FIGS. 7A-7B near the optical interface 240. The adapter 701 includes only the upper waveguide 715A. FIG. 8B illustrates the cross section B-B which includes all four waveguides 715A-D that form the optical via 720. As shown, the width W2 of waveguide 715A is larger than the widths W1 of waveguides 715B-D. Moreover, although waveguide 715A is shown as having the same width W2 as in FIG. 8A, at the cross section B-B, the width of waveguide 715A may have begun to taper (i.e., shrink) relative to cross section A-A.

Figure 8C:
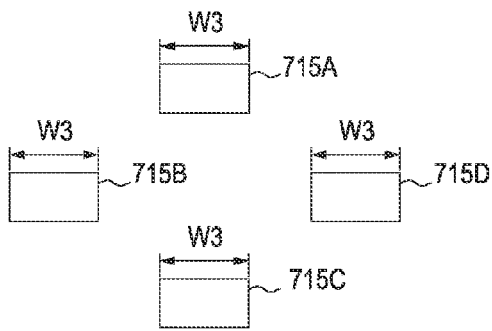

FIG. 8C illustrates the cross section C-C of adapter 701. As shown here, the width W3 of waveguide 715A has decreased from the width W2 shown in FIG. 8B, while the width W3 of waveguides 715B-D has increased relative to the width W1 shown in FIG. 8B. As the width of waveguide 715A tapers, the optical energy gradually transitions from an optical mode which is confined by waveguide 715A to a mode which includes more and more of all the waveguides 715A-D at positions farther away from the cross section B-B. Of course, the opposite is true. For optical signals traveling towards the optical interface 240, increasing the width of waveguide 715A while decreasing the widths of waveguides 715B-D cause the optical mode to be confined primarily in waveguide 715A. Moreover, although FIG. 8C illustrates the waveguides 715A-D have the same width W3, in other embodiments, the waveguides 715 may have different widths.

Figure 8D:
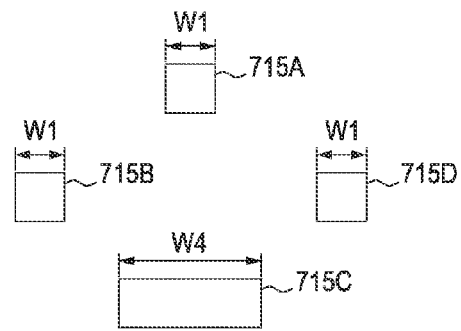

FIG. 8D illustrates the cross section D-D in FIGS. 7A and 7B. As the adapter 701 continues to extend away from the optical interface 240, the width W4 of waveguide 715C increases while the width W1 of waveguides 715A, 715B, and 715D decreases—e.g., the waveguides 715A, 715B, and 715D may have the same width W1 as the width of the waveguides 715B-D at cross section B-B. Doing so causes the optical mode to be confined in waveguide 715C. Eventually, the waveguides 715A, 715B, and 715D terminate which confines substantially all of the optical mode in waveguide 715C. The inverse taper structures shown in FIGS. 6A and 6B may then be used to optically couple waveguide 715C to the silicon waveguide 220. Furthermore, the widths and heights of the waveguides 715 may vary according to the dimensions discussed above for waveguides 415 illustrated in FIGS. 5A-5D.

Figures 9A, 9B:
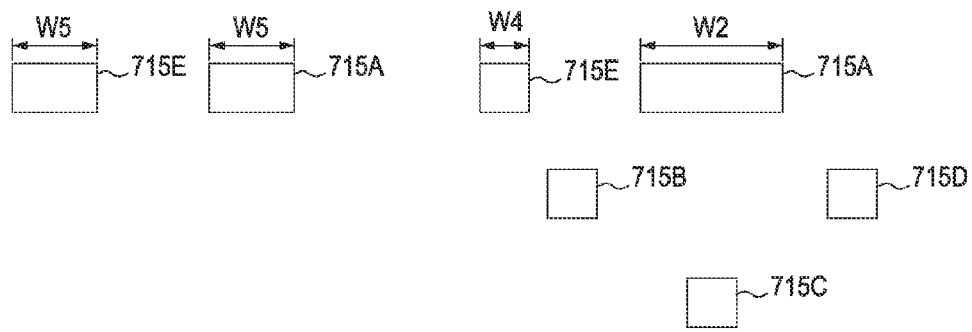
FIGS. 9A and 9B illustrate cross-sectional views of the multi-layer adapter shown in FIGS. 7A and 7B with the multi-layer adapter, according to embodiments disclosed herein.

FIGS. 9A and 9B illustrate cross-sectional views of the SOI device in FIGS. 7A and 7B with the multi-layer adapter, according to embodiments disclosed herein. Instead of using a single waveguide to transmit an optical signal to, or receive an optical signal from, the optical component 420, FIGS. 9A and 9B illustrate an adapter 701 where two waveguides are exposed at the optical interface 240.

FIG. 9A illustrates the cross section A-A of FIGS. 7A and 7B which includes waveguides 715A and 715E that are disposed in the same layer in the SOI device 700. Near the optical interface, the widths W5 of the waveguides 715A and 715E are substantially the same. Thus, the optical mode confined by both of these waveguides. However, as shown by FIG. 9B which illustrates the cross section B-B, the width of waveguide 715E decreases while the width of waveguide 715A increases. The tapering down of waveguide 715E and the tapering up of waveguide 715A forces the optical mode into waveguide 715A. One embodiment of a dual-tip coupler that may be used as waveguides 715A and 715E to interface with the external optical component is found in U.S. patent application Ser. No. 14/322,661 entitled "DUAL TIP OPTICAL COUPLER" which is herein incorporated by reference.

The waveguide 715E may terminate at or near cross section B-B. Although in this embodiment waveguide 715E terminates after the optical signal reaches the other waveguides 715B-D, in another embodiment, the waveguide 715E may terminate before the waveguides 715B-D are reached. Stated differently, waveguide 715E may terminate within the distance D1, and thus, have a length that ranges between 50-200 microns. Furthermore, the widths and heights of the waveguides 715 may vary according to the dimensions discussed above for waveguides 415 in FIGS. 5A-5D.

FIGS. 10A-10C illustrate various views of an SOI device 1000 with multi-layer adapter, according to embodiments disclosed herein. In SOI device 1000, the silicon waveguide 220 extends to optical interface 240 and forms part of adapter 1001. That is, adapter 1001 uses a portion of waveguide 220 to transfer optical signals between the SOI device 1000 and the optical component 420 at the interface 240.

FIG. 10B illustrates the cross section A-A in FIG. 10A where the adapter includes three waveguides 1015A-C (which may be made of silicon nitride, silicon oxynitride, or polysilicon) and the silicon waveguide 220. Near the optical interface 240, the width W6 of the waveguides 1015A-C may be similar to the width W7 of the silicon waveguide 220. As such, the optical mode may be distributed across the four waveguides. In one embodiment, because of the greater contrast of the refractive indices of silicon and the insulative material relative to the contrast of the refractive indices of the waveguides 1015 (e.g., silicon nitride or silicon oxynitride) to the insulative material, the width W7 of the silicon waveguide 220 may be smaller than the width W6 of the waveguides 1015 in order to optimally distribute the optical mode across the waveguides.

FIG. 10C illustrates the cross section B-B as the adapter 1001 extends away from the optical interface 240. As shown, the width W8 of the silicon waveguide increases relative to the portion of the adapter 1001 shown in FIG. 10B. Moreover, the widths W6 of the other waveguides 1015A-C may remain the same or decrease. By increasing the width of the silicon waveguide 220 without increasing the width of the waveguides 1015A-C, the optical mode becomes more and more confined in waveguide 220. Thus, when the waveguides 1015 terminate, most if not all of the optical signal is transmitted by the silicon waveguide 220. For optical signals propagating in the opposite direction (i.e., from the SOI device 1000 to the optical component 420), as the silicon waveguide 220 tapers, the optical distributes across all the waveguides 220, 1015, thereby increasing the size of the optical mode to better match the optical mode of the optical component 420.

FIGS. 11A-11C illustrate various views of an SOI device 1100 with multi-layer adapter 1101, according to embodiments disclosed herein. As illustrated in FIG. 11A, the adapter 1101 has a similar structure as the adapter 401 in FIGS. 4A and 4B except that the silicon waveguide 220 extends to the optical interface 240. That is, instead of the silicon waveguide 220 terminating before reaching the optical interface 240, waveguide 220 continues to extend and carry the optical signal until the interface 240 is reached.

FIG. 11B illustrates the cross-section A-A shown in FIG. 11A. The waveguides 1115A-D may have the same dimensions and spacing as the waveguides 415A-D illustrated in FIG. 5A, however, this cross-section includes the silicon waveguide 220. By permitting the silicon waveguide 220 to extend to the optical interface 240, the adapter 1101 may exhibit better mode control than embodiments where the silicon waveguide terminates before reaching the interface.

FIG. 11C illustrates the cross-section B-B in FIG. 11A. In this cross section, the waveguides 1115A, 1115B, and 1115D have terminated. Although not shown, the widths of waveguides 1115A, 1115B, and 1115D may taper or decrease as the adapter 1101 extends away from the optical interface 240 thereby forcing the optical mode into waveguide 1115C and waveguide 220, although this is not a requirement. The width W11 of waveguide 1115C decreases relative to the width W9 shown in FIG. 11B. Conversely, the width W12 of waveguide 220 increases relative to the width W10 shown in FIG. 11B. This inverse taper of waveguides 1115C and 220 confines the optical mode primarily in the silicon waveguide 220. Thus, once the waveguide 1115C terminates at the end of the adapter 1101, the optical signal propagates primarily in the silicon waveguide 220.

Figure 12A:
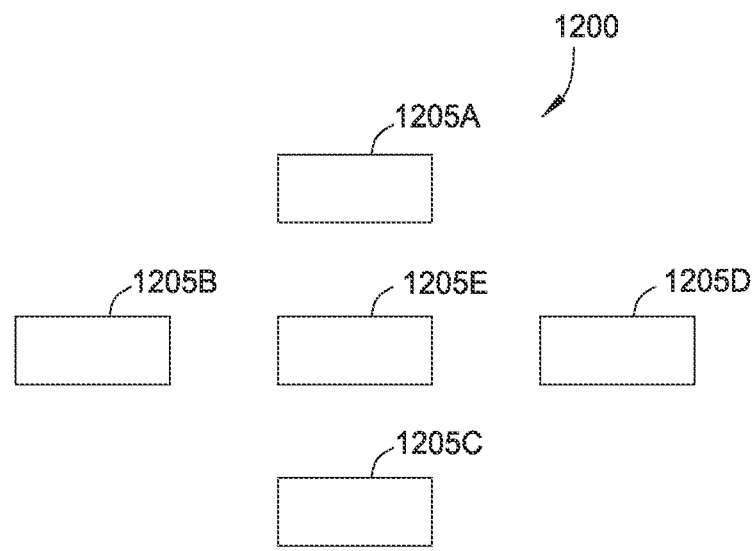
FIGS. 12A-12B illustrate cross-sectional views of an SOI device with a multi-layer adapter, according to embodiments disclosed herein.
Figure 12B:
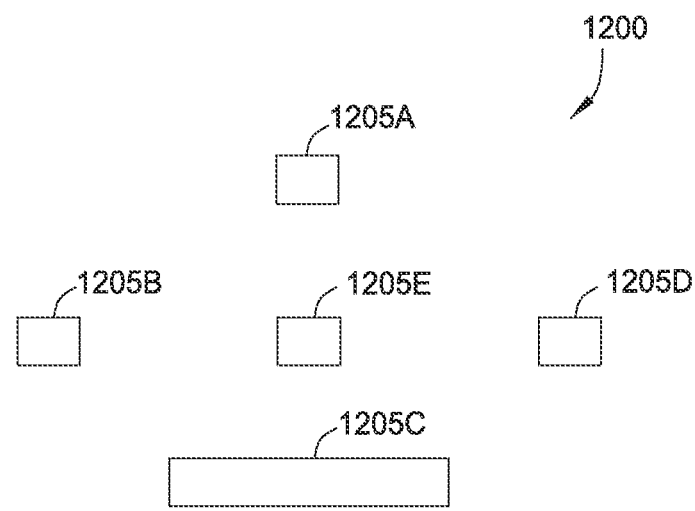

FIGS. 12A-12B illustrate cross-sectional views of an SOI device with a multi-layer adapter, according to embodiments disclosed herein. In one embodiment, FIG. 12A illustrates a cross-section of a multi-layer adapter 1200 near the coupling interface of an SOI device while FIG. 12B illustrates a cross-section of the adapter 1200 at some distance away from the coupling interface. As the adapter 1200 extends away from the coupling interface, the width of the waveguides 1205A, B, E, and D decreases while the width of waveguide 1205C, which is closest to the surface layer, increases. That is, the fifth waveguide 1205E may also taper in a similar way as waveguides 1205A, B, and D to adiabatically transfer the optical energy in a mode confined by all five waveguides at the coupling interface to a mode predominantly confined in waveguide 1205C as the adapter extends away from the coupling interface. However, the opposite is also true. That is, tapering the widths also enables a signal introduced in the lower waveguide 1205C to transfer to a mode confined by all the waveguides 1205A-E as the optical signal propagates towards the coupling interface.

In the embodiments described above, the adapters shown in FIGS. 5A-5B, 8B-8D, 9B, 10B-10C, and 11B may be modified to include the fifth waveguide 1205E shown in FIGS. 12A and 12B and still maintain the functionality and advantages described herein. Furthermore, in other embodiments, additional waveguides (e.g., six or more) may be added to the adapters. For example, additional layers may be used to add more waveguides to the adapter. In one example, a multi-layer adapter may include four or five layers that each includes one or more waveguides rather than the three layers shown.

FIGS. 13A-13D illustrate various views of an SOI device 1300 with a multi-layer adapter 1301, according to embodiments disclosed herein. Specifically, SOI device 1300 includes a multi-layer adapter 1301 above the surface layer 205 which contains the silicon waveguide 220. In this example, the adapter 1301 includes two levels which include waveguide 1315A and waveguide 1315B, respectively. In one embodiment, the separation distance between waveguides 1315A and 1315B ranges between 1 to four microns.

Figure 13A:
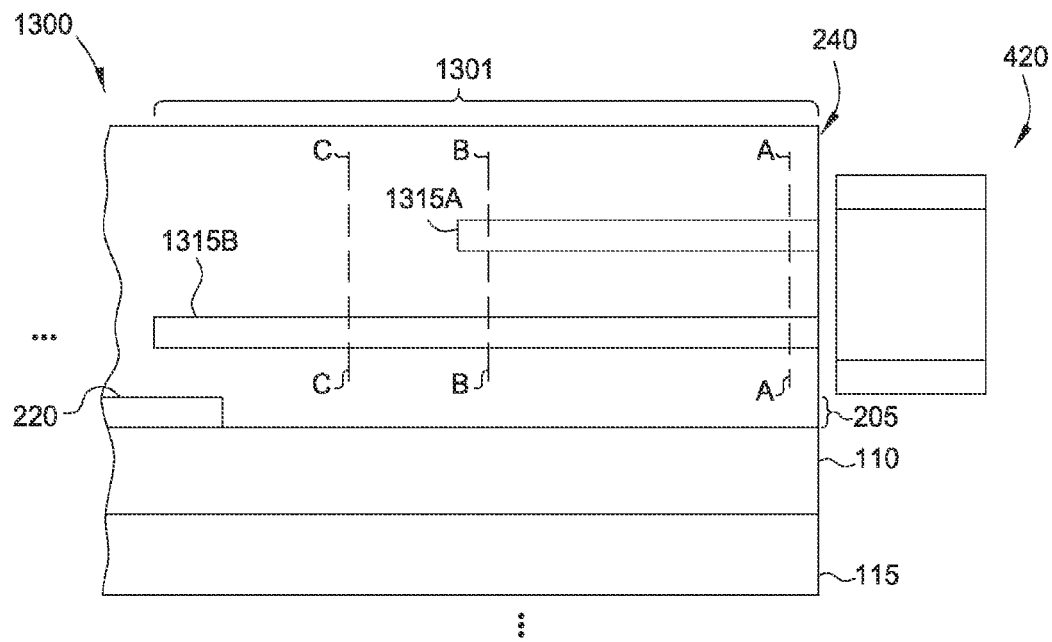
FIGS. 13A-13D illustrate various views of an SOI device with a multi-layer adapter, according to embodiments disclosed herein.
Figures 13B, 13C:
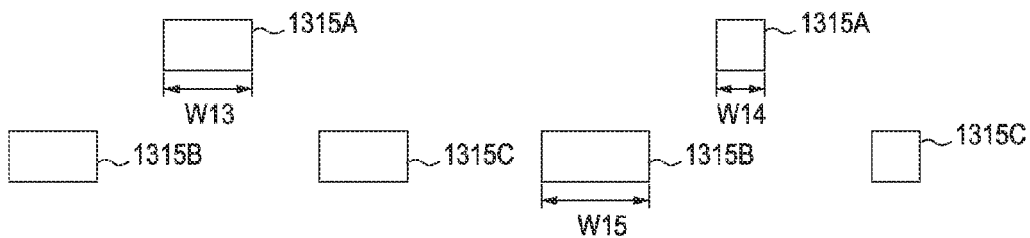

FIG. 13B illustrates the cross section A-A in FIG. 13A near the optical interface 240. As shown, the adapter 1301 includes three waveguides: upper waveguide 1315A and two lower waveguides 1315B and 1315C. In one embodiment, the separation distance between the two lower waveguides 1315B and 1315C ranges from 1 to 4 microns. Further, at or near the optical interface 240 (within 5-10 microns), the height and width of the waveguides 1315 may be the same. As such, the optical mode may be spread evenly between these waveguides 1315.

FIG. 13C illustrates the cross section B-B where the adapter 1301 extends away from the optical interface 240. As shown here, the upper waveguide 1315A and lower waveguide 1315C have tapered such that their widths W14 have decreased relative to their widths W13 shown in FIG. 13B. In contrast, the width W15 of the lower waveguide 1315B has increased relative to its width W13 in FIG. 13B. In one embodiment, the decrease in widths of waveguides 1315A and 1315C and the increase of width of waveguide 1315B adiabatically shifts the optical mode primarily into waveguide 1315B when an optical signal is being received by the SOI device 1300 from the external optical component 420. Conversely, when an optical signal is transmitted from the SOI device 1300 to the external component 420, the optical mode shifts from being primarily contained in waveguide 1315B to being shared among all the waveguides 1315.

Figure 13D:

FIG. 13D illustrates the cross section C-C in FIG. 13A where the two waveguides 1315A and 1315C have terminated. As such, the optical signal is transmitted primarily in waveguide 1315B. In one embodiment, the width W16 of waveguide 1315B may be wider than its width W15 in FIG. 13C. However, in another embodiment, the widths W15 and W16 may be substantially the same.

Although not shown in cross section C-C, the waveguide 1315B overlaps the silicon waveguide 220 to permit optical signals to be transmitted between the two waveguides. In one example, the waveguide 1315B and silicon waveguide 220 may taper as shown in FIGS. 6A and 6B in the region where they overlap. The separation gap between the silicon waveguide 220 and the waveguide 1315B may range between a few nanometers to 1 micron, or more specifically, from 10 nm to 500 nm.

In one embodiment, the SOI device 1300 shown in FIG. 13A may be used as an optical via. That is, instead of the lower waveguides 1315B and 1315C extending to the optical interface 240 as shown, these waveguides may terminate such that only the upper waveguide 1315A extends to the optical interface 240. In this example, which is similar to the device 700 shown in FIG. 7A, the external optical component 420 may be centered around the upper waveguide 1315A in order to improve coupling efficiency. Thus, in the regions where the upper waveguide 1315A and the lower waveguides 1315B and 1315C are all contained in a cross section of the device 1300, the adapter 1301 forms an optical via that transfers an optical signal from a lower level near the silicon layer 205 to an upper level of the device, and vice versa.

Figure 14:
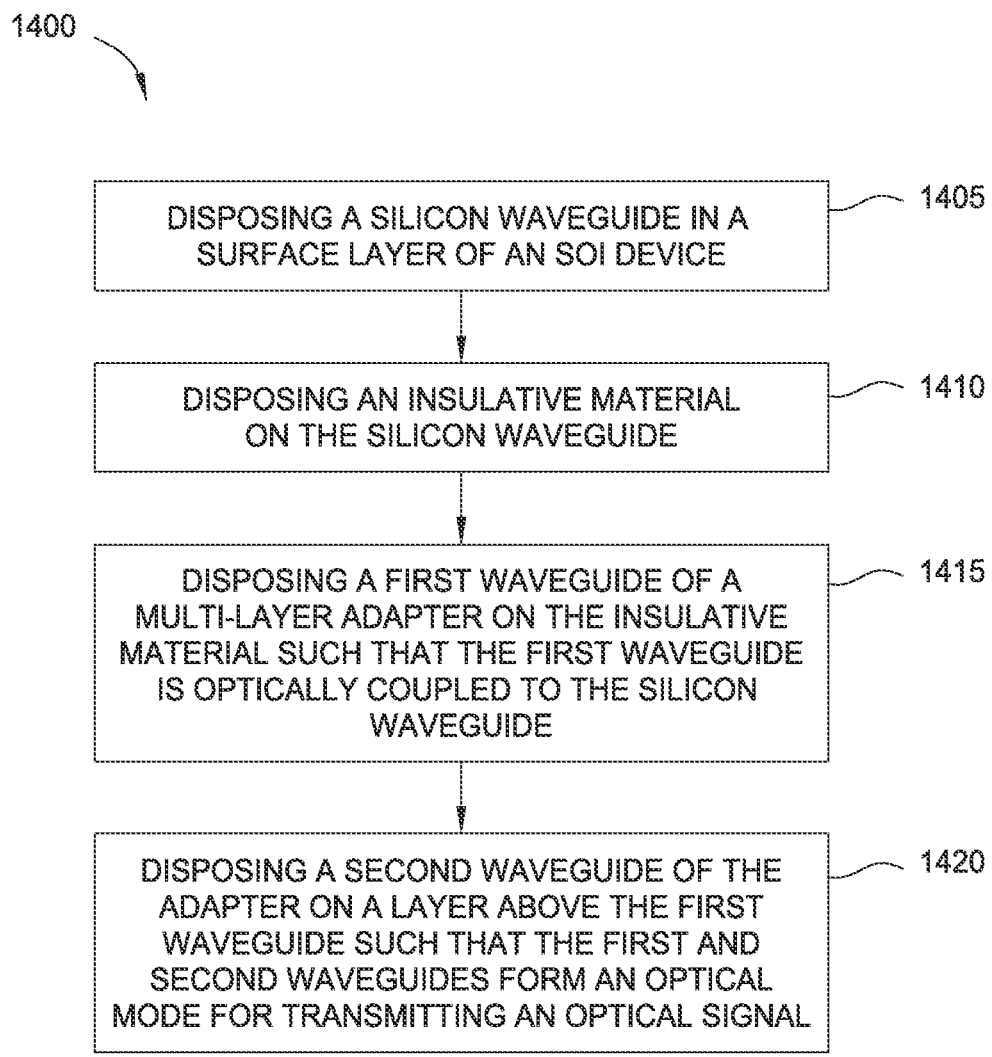
FIG. 14 is a method of manufacturing an SOI device with a multi-layer adapter, according to one embodiment disclosed herein.

FIG. 14 is a method 1400 of manufacturing an SOI device with a multi-layer adapter, according to one embodiment disclosed herein. At block 1405, a silicon waveguide is disposed in a silicon surface layer of an SOI device. In one embodiment, the surface layer includes crystalline silicon that is processed (e.g., etched or doped) to form the silicon waveguide. Although the embodiments herein describe including the silicon waveguide in a SOI structure, this is not a requirement and the silicon waveguide may be deposited on and in various substrates and optical devices.

At block 1410, an insulative material is disposed on the silicon waveguide. As shown in FIG. 3, the insulative material 230 (e.g., silicon dioxide or silicon oxynitride) establishes a gap between the silicon waveguide 220 and the waveguides 340 in the adapter 235. In one embodiment, the gap may be such that the adapter 235 is above the silicon surface layer as well as other optical components disposed in the surface layer. However, in other embodiments, a portion of the adapter may be on the same layer as optical components in the surface layer such as an optical modulator or detector.

At block 1415, a first waveguide of the adapter is disposed on the insulative material such that the first waveguide is optically coupled to the silicon waveguide. For example, the first waveguide may be disposed on a first layer that is above the surface layer. In one embodiment, the first waveguide at least partially overlaps the silicon waveguide. In one example, the first waveguide and the silicon waveguide may form the inverse taper structure shown in FIGS. 6A and 6B in order to adiabatically couple the two waveguides in the region where they overlap.

At block 1420, a second waveguide of the adapter is disposed above the first layer containing the first waveguide of the adapter. For example, the second waveguide may be disposed in a second layer of the SOI device such that the first layer containing the first waveguide is between the second layer and the surface layer containing the silicon waveguide. Furthermore, a gap formed using insulative material may separate the second waveguide in the second layer from the first waveguide in the first layer. Nonetheless, this gap may be controlled such that the first and second waveguides form an optical mode in an adiabatic structure for transmitting an optical signal to, or receiving an optical signal from, an external optical component.

In one embodiment, the second waveguide is disposed between two metal layers in the SOI device. The metal layers include one or more planar electrodes used to route electrical signals in the SOI device. For example, as shown in FIG. 3, the planar electrodes 335 may route control signals from the conductive pads 315 to the optical modulator 215. Here, both waveguides 340B and 340C are between two adjacent (i.e., neighboring) metal layers 310—waveguide 340B is between metal layers 310A and 310B while waveguide 340C is between metal layers 310B and 310C. The waveguides 340B, 340C are disposed in via (or intermetal) layers 305 which include vias 330 that electrically couple the planar electrodes 335 located in different metal layers 310. Thus, in FIG. 3, the waveguides 340 of adapter 235 are arranged such that they are in the via layers 305 but not the metal layers 310. Further still, in one embodiment, the waveguides 340 are arranged such that no conductive material (neither vias 330 nor planar electrodes 335) is between the waveguides 340.

In one embodiment, the waveguides in the adapter are formed using different processing steps from those used to form the vias. That is, although the vias and waveguides may be disposed in the same intermetal layer, different masks and fabrication techniques/apparatuses may be used to form the different structures. Nonetheless, by forming the multi-layer adapter above the surface layer rather than below the surface layer in the insulation region of an SOI device, the adapter can be formed using existing manufacturing infrastructure and photonic chip processing. Stated differently, the adapters can be formed using a few extra processing steps that may be performed in the same manufacturing facility. In contrast, because an adapter formed in the insulation layer below the surface layer may be formed at the same time the SOI structure is created, two different manufacturing facilities may be needed—one to form the SOI structure that includes an adapter below the surface layer and another to form the optical components in the surface layer with their respective electrical connections.

In the preceding, reference is made to embodiments presented in this disclosure. However, the scope of the present disclosure is not limited to specific described embodiments. Instead, any combination of the features and elements provided herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   disposing a silicon waveguide in a silicon layer of an optical device;
   disposing an insulative material on the silicon waveguide;
   disposing a first waveguide of a multi-layer adapter in a first layer of the optical device on the insulative material to optically couple the first waveguide to the silicon waveguide;
   disposing a first pair of adjacent metal layers in the optical device, each of the adjacent metal layers comprising a respective planar electrode electrically coupled to an optical component in the silicon layer; and
   disposing a second waveguide of the multi-layer adapter in a second, different layer of the optical device between the first pair of adjacent metal layers such that the first and second waveguides form an optical structure for at least one of transmitting and receiving an optical signal, wherein at least one of the first and second waveguides of the multi-layer adapter are exposed at an optical interface of the optical device for transferring an optical signal between the optical device and an external optical component, wherein the first and second waveguides of the multi-layer adapter comprise respective material compositions different than the insulative material.

2. The method of claim 1, wherein the second layer comprises a via that electrically couples the respective planar electrodes in the first pair of adjacent metal layers.

3. The method of claim 1, disposing a third waveguide of the multi-layer adapter in a third layer such that the first, second, and third waveguide form an adiabatic optical system, wherein the third layer is between a second pair of adjacent metal layers in the optical device, each of the second pair of adjacent metal layers comprising a respective planar electrode electrically coupled to the optical component in the silicon layer.

4. The method of claim 3, wherein the third layer comprises a via that electrically couples the respective planar electrodes in the second pair of adjacent metal layers.

5. The method of claim 1, wherein the first and second waveguides are separated by a gap defined by one or more metal layers.

6. The method of claim 1, further comprising:
   optically coupling the optical component to the silicon waveguide to establish an optical path that permits an optical signal to at least one of (i) propagate from the optical component, through the silicon waveguide, through the first and second waveguides of the multi-layer adapter, and to the optical interface and (ii) propagate from the optical interface, through the first and second waveguides, through the silicon waveguide, and to the optical component.

7. An optical device, comprising:
   a silicon layer comprising an optical component and a silicon waveguide;
   a first waveguide of a multi-layer adapter optically coupled to the silicon waveguide and disposed on a first layer spaced apart from the silicon waveguide;
   a first pair of adjacent metal layers, each comprising a respective planar electrode electrically coupled to the optical component in the silicon layer;
   a second waveguide of the multi-layer adapter disposed on a second layer spaced apart from the first layer and disposed between the first pair of adjacent metal layers, the first and second waveguides forming an optical structure for at least one of transmitting and receiving an optical signal; and an optical interface configured to transfer an optical signal between the optical device and an external optical component, wherein at least one of the first and second waveguides are exposed at the optical interface, wherein the first and second waveguides of the multi-layer adapter comprise respective material compositions different than the insulative material.

8. The optical device of claim 7, wherein the second layer comprises a via that electrically couples the respective planar electrodes in the first pair of adjacent metal layers.

9. The optical device of claim 7, further comprising:
a third waveguide of the multi-layer adapter disposed on a third layer such that the first, second, and third waveguides form an adiabatic optical system;
third and fourth metal layers, each comprising a respective planar electrode electrically coupled to the optical component in the silicon layer, wherein the third layer is between the third and fourth metal layers.

10. The optical device of claim 9, wherein the third layer comprises a via that electrically couples the respective planar electrodes in the third and fourth metal layers.

11. The optical device of claim 7, wherein the first and second waveguides are separated by a gap defined by one or more metal layers.

12. The optical device of claim 7, wherein the silicon waveguide comprises crystalline silicon and the first and second waveguides comprise a same material that is different from crystalline silicon.

13. A semiconductor on insulator (SOI) device, comprising:
a surface layer comprising an optical component and a sub-micron waveguide;
a semiconductor substrate;
an insulation layer disposed between the surface layer and the semiconductor substrate; and
a multi-layer adapter optically coupling the sub-micron waveguide to an optical interface configured to transfer an optical signal between the SOI device and an external optical component, wherein the multi-layer adapter comprises a plurality of layers each comprising at least one waveguide for propagating the optical signal, wherein each of the plurality of layers is disposed between adjacent metal layers, each metal layer comprising a planar electrode electrically coupled to the optical component in the surface layer, wherein the first and second waveguides of the multi-layer adapter comprise respective material compositions different than the insulative material.

14. The SOI device of claim 13, wherein each of the plurality of layers comprises a respective via electrically coupling one of the metal layers to one of (i) another metal layer and (ii) the optical component.

15. The SOI device of claim 13, wherein each of the plurality of layers is separated by a respective gap defined by one or more of the metal layers.

16. The SOI device of claim 13, further comprising:
a surface in the semiconductor substrate defining a recess that extends away from the optical interface, wherein the surface is recessed from the optical interface by a distance between 50 to 200 microns.

17. The SOI device of claim 13, wherein a first one of the plurality of layers comprises first and second waveguides of the multi-layer adapter, wherein a dimension of the first waveguide decreases as the first waveguide extends towards the optical interface and the dimension of the second waveguide one of (i) remains constant or (ii) increases as the second waveguide extends towards the optical interface, wherein both the first and second waveguides are exposed at the optical interface.

18. The SOI device of claim 13, further comprising:
a trench in the semiconductor substrate, wherein the trench is between at least a portion of the multi-layer adapter and a surface of the semiconductor substrate facing the multi-layer adapter along a direction that is perpendicular to the surface, and wherein the trench extends in a same direction as the portion of the multi-layer adapter.

* * * * *